May 13, 1941. S. B. KURZINA, JR 2,242,080
SPROCKET-REMOVING FIXTURE
Filed Dec. 22, 1937
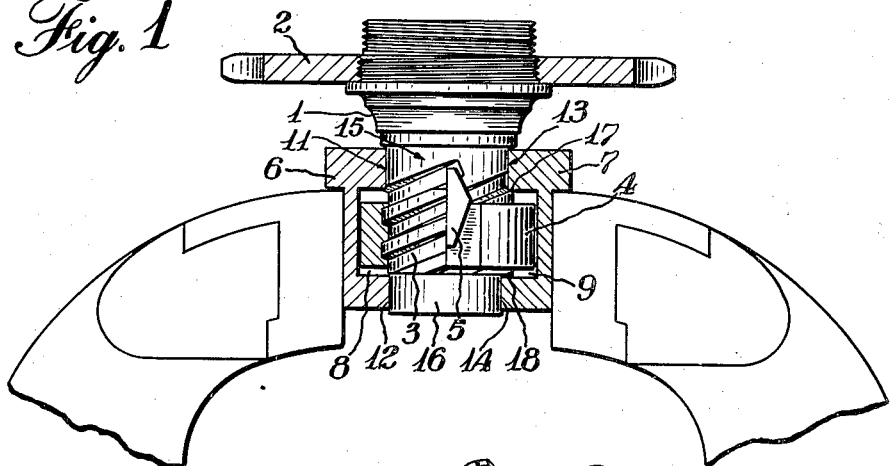
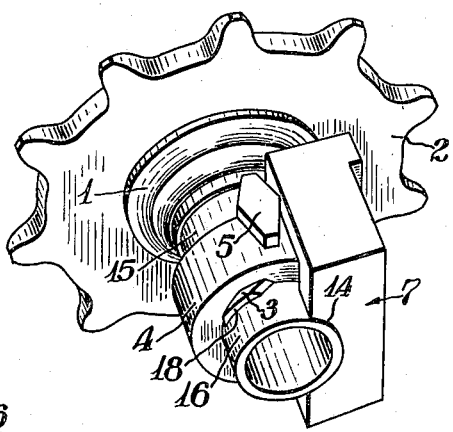
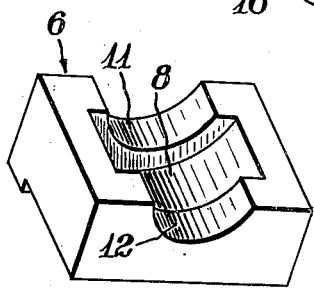
Witness:
Burr W. Jones
INVENTOR.
Stanley B. Kurzina Jr.
BY Clinton S. James
ATTORNEY.

Patented May 13, 1941

2,242,080

UNITED STATES PATENT OFFICE 2,242,080

SPROCKET-REMOVING FIXTURE

Stanley B. Kurzina, Jr., Elmira, N. Y., assignor, by mesne assignments, to Bendix Aviation Corporation, South Bend, Ind., a corporation of Delaware Application December 22, 1937, Serial No. 181,199

4 Claims. (Cl. 81—38)

The present invention relates to a sprocket-removing fixture for bicycle hubs and the like and more particularly to a device for rigidly holding the bearing and screw shaft member of the commercial Morrow coaster brake while removing or applying the drive sprocket and its locking ring thereto.

In servicing Morrow coaster brakes of the type illustrated in the patent to Morrow No. 906,149, it is sometimes desired to remove the chain sprocket and its lock ring from the bearing and screw shaft member on which it is mounted. Considerable force is often required to loosen the threaded connection of these elements, and various devices have been used to hold the bearing member from turning while the sprocket is being removed by a chain wrench or the like. Since the bearing member is not adapted for the reception of a wrench, it has been necessary to devise some means for clamping the threaded portion thereof, but such devices which have heretofore been produced have been complicated, uncertain in action, subject to deformation so as to resist removal, and/or liable to mutilate the threads of the bearing member.

It is an object of the present invention to provide a novel sprocket-removing fixture for coaster brakes which is simple in construction, positive in action, and not liable to injure the threads or bearing surfaces of the sprocket-carrying member.

It is another object to provide such a device which utilizes the control nut of the coaster brake to cooperate with the threads of the sprocket-carrying member in holding the same against rotation.

It is a further object to provide such a device which comprises a pair of identical parts of simple form so that only one type of part has to be manufactured.

It is another object to provide such a device which is equally effective in preventing rotation of the sprocket-carrying member in either direction.

Further objects and advantages will be apparent from the following description taken in connection with the accompanying drawing in which:

Fig. 1 is a side view partly in section of a preferred embodiment of the invention as mounted in a vise to hold the sprocket and bearing member of a Morrow coaster brake while the sprocket is being removed;

Fig. 2 is a perspective view of the fixture in operative position with one of the blocks removed to expose the control nut of the coaster brake; and Fig. 3 is a detail in perspective of one of the clamping blocks of the fixture.

Referring first to Fig. 1 of the drawing, there is illustrated a bearing sprocket member 1 of a Morrow coaster brake carrying a sprocket 2 threaded thereon. The bearing member is provided with external threads 3, and a control nut 4 is mounted on said threads and is provided with a radially extending lug 5 which in the operation of the brake is used to control the brake cylinder and drive clutch.

According to the present invention, when it is desired to remove the sprocket from its bearing member, it is mounted as shown in Fig. 1 in a fixture comprising a pair of clamping blocks 6 and 7 having recesses 8 and 9 in the interior thereof adapted to loosely receive the nut 4, and having interior flanges 11, 12 and 13, 14 adapted to bear on and conform with the cylindrical surfaces 15 and 16 of the sprocket bearing member which are formed contiguous to the threaded portion 3 thereof.

The ends of the threads 3 terminate in radial shoulders 17 and 18 which are engaged by the flanges 11, 12, 13 and 14 whereby longitudinal movement of the sprocket bearing member in the fixture is prevented. Longitudinal movement of the nut 4 in the fixture is also limited by engagement thereof with the same flanges, and rotary movement of the nut with respect to the fixture is prevented by the radial lug 5 of the nut which projects as illustrated in Fig. 2 between the two blocks constituting the fixture.

It will thus be seen that when the sprocket bearing member and fixture are mounted in a vise as illustrated in Fig. 1, rotation of the sprocket bearing member in either direction causes the nut 4 to travel on the threads 3 until it encounters the shoulders formed by the interior flanges of the clamping blocks 6, 7. Since longitudinal movement of the sprocket bearing member 1 is prevented by the abutment of the shoulders at the ends of the threads 3 with said flanges, it is clear that further rotation of the sprocket bearing member 1 is prevented, and torque may be applied to the sprocket 2 to effect the removal thereof while the bearing member 1 is thus held stationary.

It will be readily appreciated that inasmuch as the nut 4 is a component part of the coaster brake, the only parts that need be supplied to produce the fixture are the blocks 6 and 7, and since these blocks are identical in form and interchangeable, there is really only one simple element to be manufactured.

It will be apparent, moreover, that since the blocks 6 and 7 are held together only by the clamping pressure of the vise in which they are mounted, they will be immediately disengaged without any difficulty when removed from the vise. Moreover, since the nut 4 is so formed as to have a proper running fit on the threads 3, the threads will not be mutilated in any way by the application of force therethrough in removing or replacing the sprocket.

Although but one form of the invention has been shown and described in detail, it will be understood that other embodiments are possible and various changes may be made in the design and arrangement of the parts without departing from the spirit of the invention as defined in the claims appended hereto.

What is claimed is:

1. In a sprocket-removing fixture for a screw shaft of a coaster brake, which screw shaft is threaded for a portion of its length with smooth portions contiguous thereto and has a nut threaded thereon, a clamping member formed to fit the smooth portions of the shaft and having a recess adapted to receive the nut, and means preventing rotation of the nut in the clamping member, said clamping member having shoulders adapted to engage the ends of the threads on the shaft and prevent longitudinal movement of the shaft therein.

2. A clamping fixture for a shaft, which shaft is threaded for a portion of its length and has smooth portions contiguous thereto and a nut threaded thereon, said clamping fixture including a clamping member formed to fit the smooth portions of the shaft and having a recess adapted to receive the nut, said nut having a projection adapted to engage the clamping member and prevent rotation of the nut therein, said clamping member having shoulders defining said recess and limiting longitudinal movement of the nut therein, said shoulders being also adapted to engage the ends of the threads on the shaft and thus prevent longitudinal movement of the shaft therein.

3. A clamping fixture for a shaft, which shaft has a threaded portion and contiguous smooth portions and a nut on the threaded portion having a radial projection; said clamping fixture comprising a pair of clamping members having flanges adapted to bear on said smooth portions, and recesses between the flanges receiving the nut, the inner sides of said flanges being arranged to engage the sides of the nut and the ends of the threads to prevent longitudinal movement of the nut and of the shaft in said fixture, said clamping members being adapted to be located on opposite sides of the radial projection to prevent rotation of the nut therebetween.

4. A clamping fixture for a shaft, which shaft has a threaded portion and contiguous smooth portions and a nut on the threaded portion having a radial projection; said clamping fixture comprising a pair of clamping members having parallel flat external surfaces adapted to be received in the jaws of a vise, and having internal flanges formed to bear on the smooth portions of the shaft adjacent the ends of the threads thereof and defining recesses adapted to receive the nut, said clamping members being adapted to be located on opposite sides of the radial projection of the nut to prevent rotation of the nut therein.

STANLEY B. KURZINA, JR.